(12) United States Patent
Hörz et al.

(10) Patent No.: US 7,049,827 B2
(45) Date of Patent: May 23, 2006

(54) SERVICING DEVICE AND FURTHERMORE EXPENDABLE MATERIAL AND A CAPACITIVE SENSOR THEREFOR

(75) Inventors: Jürgen Hörz, Riederich (DE); Klaus Keinrad, Köngen (DE)

(73) Assignee: Festo AG & Co., Esslingen (DE)

( * ) Notice: Subject to any disclaimer, the term of this patent is extended or adjusted under 35 U.S.C. 154(b) by 74 days.

(21) Appl. No.: 10/252,975

(22) Filed: Sep. 23, 2002

(65) Prior Publication Data
US 2003/0076119 A1 Apr. 24, 2003

(30) Foreign Application Priority Data
Oct. 19, 2001 (EP) .................. 01124915.8

(51) Int. Cl.
G01R 27/04 (2006.01)
G01R 27/26 (2006.01)

(52) U.S. Cl. .................. 324/632; 324/663; 324/658

(58) Field of Classification Search ................ 324/632, 324/663, 658, 686; 396/626; 73/304 C
See application file for complete search history.

(56) References Cited

U.S. PATENT DOCUMENTS

| 4,552,570 | A | | 11/1985 | Gravatt ........................... 55/20 |
| 4,594,892 | A | * | 6/1986 | Asmundsson ............. 73/304 C |
| 4,747,378 | A | * | 5/1988 | Cantoni .................. 123/196 A |
| 4,828,589 | A | | 5/1989 | Bauer et al. .................. 55/2.7 |
| 4,939,468 | A | * | 7/1990 | Takeuchi ..................... 324/690 |
| 5,029,553 | A | * | 7/1991 | Cox ........................... 118/674 |
| 5,540,086 | A | * | 7/1996 | Park et al. .................. 73/53.05 |
| 5,765,072 | A | * | 6/1998 | Ohtani et al. ................ 396/626 |
| 6,139,609 | A | | 10/2000 | Eimer et al. ................ 96/117.5 |
| 6,435,207 | B1 | * | 8/2002 | Mewes et al. ........... 137/487.5 |
| 6,459,995 | B1 | * | 10/2002 | Collister ....................... 702/23 |
| 6,553,812 | B1 | * | 4/2003 | Park et al. .................. 73/54.01 |

FOREIGN PATENT DOCUMENTS

| DE | 19645009 A1 | 5/1998 |
| EP | 0065019 A1 | 11/1982 |
| EP | 0594216 B1 | 4/1994 |
| JP | 03-229979 | 10/1990 |

* cited by examiner

Primary Examiner—Anjan Deb
Assistant Examiner—John Teresinski
(74) Attorney, Agent, or Firm—Hoffman & Baron, LLP

(57) ABSTRACT

A servicing device and more particularly an oiler or a filter device, for the preparation of a pressure medium, which comprises a capacitive sensor having at least one first electrode responsive to at least one operational parameter of the servicing device. An expendable material and more particularly a filter means or an additive for such a servicing device, which is renewable and is able to be utilized by the servicing device for the preparation of the pressure medium and bears a capacitively detectable code means, on the basis of at least one operational parameter of the servicing device is detected. Furthermore there is a capacitive sensor for such a servicing device.

25 Claims, 4 Drawing Sheets

SERVICING DEVICE AND FURTHERMORE EXPENDABLE MATERIAL AND A CAPACITIVE SENSOR THEREFOR

BACKGROUND OF THE INVENTION

The invention relates to a servicing device, and more especially an oiler or a filter device, for the treatment of a pressure medium. The invention furthermore relates to an expendable material, more particularly a filter material or an additive material, for a servicing device for the treatment of a pressure medium and moreover a capacitive sensor for such a servicing device.

THE PRIOR ART

For the treatment of a pressure medium, as for instance compressed air, servicing devices in many different designs are employed. For instance, filter devices are utilized for the filtering devices, for example for the removal of dirt from the pressure medium. Moreover a filter device or a dryer may be provided for this purpose, for example to clear condensed water from the pressure medium. Furthermore such a servicing device may more particularly be an oiler, which introduces oil or some other additive into the pressure medium so that the units, which are supplied with the pressure medium, for example valves, are lubricated by the added oil.

To an increasing extent in such servicing devices the operational parameters are being found by the use of sensors. Generally, it is a question of extremely simple sensors, namely of electric switches. For instance, in the case of a filter device disclosed in the German patent publication 19,951,961 A1 a filter means in the form of a filter cartridge is checked by a suitable sensor system. One or more mechanical switches and contact-free sensor means are employed as being suitable, such sensor means including for example optically or magnetically responding sensor means.

Mechanical switches are liable to failure and are subject to wear. The same applies basically for contact-free inductive switches as well, in the case of which it is a question or reed switches. Although same are actuated by a magnet they are in principle mechanical switches.

For optical sensors both a light source and also a detecting element is necessary so that this system is not only expensive but also occupies a fair amount of space in the servicing device.

A further disadvantage of known sensors is that for each operational parameter at least one, and normally more than one, sensor will be required. Using only one mechanical switch it is possible for example to detect whether a filter cartridge is present in a servicing device or not. The additional ascertainment of the filter type is not possible using the mechanical switch yielding a single electrical on or off signal. The same applies for example for the detection of liquid levels in a servicing device. Using a single mechanical switch, as for example a float switch, it is only possible to detect one single level. In principle different operational parameters, as for example the presence of a filter element and the level of condensed water collecting in the filter element can not be detected with a single conventional mechanical switch. For this purpose it is necessary to have a plurality of mechanical switches so that a comparatively large overall space is necessary. The servicing device therefore becomes bulky and additionally expensive.

SHORT SUMMARY OF THE INVENTION

One object of the invention is to improve the detection of at least one operational parameter in a servicing device.

In order to achieve these and/or other objects appearing from the present specification, claims and drawings, in the present invention a servicing device of the type initially mentioned is provided which possesses a capacitive sensor having at least one first electrode for the detection of at least one operational parameter of the servicing device. In order to achieve the object of the invention furthermore a capacitive sensor for a servicing device for the treatment of a pressure medium with at least one first electrode for the detection of at least one parameter of the servicing device in cooperation with at least one second electrode arranged on the servicing device is provided in the invention. In the case of the initially mentioned expendable material there is a proposal in accordance with the invention for it to have a capacitively detectable code, on the basis of which at least one operational parameter of the expendable material may be detected by the device's a capacitive sensor.

In comparison with sensors as so far utilized in servicing devices the capacitive sensor of the invention is more compact and is cheaper to manufacture. It allows not only the measurement of a single operational parameter, but also if necessary of several operational parameters. For instance, for a servicing device designed as a filter device different types of filter elements may be provided. Each of the different types of filter element has its own individual code able to be capacitively detected. For instance, the different filter element types have different amounts of metal therein. In the simplest case the capacitive sensor in accordance with the invention serves to detect whether a filter element is placed in the servicing device or not. In the case of a capacitively detected, different code of the filter element it is however also possible to detect the respective filter type, for instance a fine filter or a coarse filter. This is for example particularly relevant in the case of compressed air systems, since their components may be damaged by insufficiently filtered compressed air following the use of an unsuitable filter element, for example a coarse filter instead of a fine filter.

Moreover, using the capacitive filter of the invention it is also possible in principle to detect completely different operational parameters. For instance, bearing in mind the above mentioned example, it is possible not only to detect the presence and/or type of a filter element, but also whether there are for example any deposits from the pressure medium in the servicing device, as for example condensed water. Even the respective quantity of the deposit, as for instance the level of condensed water, may be detected using the sensor. Furthermore, the sensor may be employed as a sort of particle counter, whose operational parameters are detected with the sensor. In this case a collecting element, for example a filter element, has the particles, such as oil droplets or other adhering materials, on it detected by the sensor. Here a time-related change as well in the quantity of particles may be detected. The shape of the sensor only has to be such that the materials, whose operational parameters are to be detected by the sensor, are in its range of detection.

Further advantages of the invention will be gathered from the claims and from the specification.

It is an advantage for the servicing device to possess a housing, in whose interior there is a servicing space for receiving an expendable material and/or for receiving substances deposited from the pressure medium. In this case the sensor is associated with the servicing space for the detection of a dielectric able to be arranged there, as for example a filter element or an additive, on which the at least one operational parameter is dependent. In some cases the servicing space may extend as far as a pressure medium inlet and/or a pressure medium outlet of the servicing device.

It is advantageous for at least one second electrode of the sensor in the form of a counter-electrode to be arranged on the housing wall. It is also possible for a portion of the housing wall to be constituted by at least one such second electrode of the sensor. Combinations of these two measures are possible at any time. In any case the first and the second electrode of the sensor are so arranged that electric field lines between them may extend through the servicing space and accordingly a dielectric, able to be arranged there, may be detected by the sensor.

It is also possible for the electrode and the counter-electrode to be constituted by at least two neighboring sensor faces aligned toward servicing space so that electric field lines between them may extend through the servicing space and accordingly the dielectric, which is able to be placed there, is able to be detected by the sensor. The neighboring sensor faces may for example be arranged on a sort of sensor rod. In accordance with a further development of this design several neighboring sensor face, aligned or directed toward the servicing space, are provided as electrodes and counter-electrodes respectively associated with them. The respective sensor faces are in this case may constantly serve as an electrode and, respectively, a counter-electrode. It is also possible for at least one such sensor face to function alternatively as an electrode and a counter-electrode.

Preferably, the sensor extends along a first and a second section of the servicing space, the sensor being able to detect in the first section at least one first operational parameter of the servicing device and in the second section at least one second operational parameter thereof. For instance, a filter element may be placed in the first section of the servicing space whereas in the second section an additive for the pressure medium is arranged.

The servicing space is preferably surrounded by a housing wall, which has a sensor receiving space for the at least one first electrode of the sensor. The sensor receiving space may be open toward the servicing space or advantageously be separated from it by a partition.

In every case it is preferred to associate a screen with the at least one first electrode which is placed on the side thereof facing the servicing space. The screen will shield the at least one first electrode from external interfering fields so that essentially only the field present between the second of the at least one first and of the at least one second electrode takes effect or is relevant for the detection of the at least one operational parameter.

The partition between the sensor receiving space and the servicing space is preferably thinner than the housing wall so that its effect as a dielectric is minimized.

The at least one first electrode preferably has an elongated shape and accordingly is able to be arranged in parallelism to the longitudinal axis of the servicing space, more particularly in a vertical direction. This means that there is a comparatively large part of the servicing space, more particularly a plurality of sections of the servicing space, in the detection range of the at least one electrode.

More especially in the case of design of the electrode it is convenient to design same a plate and more particularly a printed circuit board.

The at least one first electrode is preferably arranged on holding means holding and securing it in position. The electrode may then be comparatively delicate in structure. The necessary strength thereof is imparted to it by the holding means.

The holding means is preferably designed for holding the at least one first electrode in the sensor receiving space. In this case the holding means together with the at least one first electrode arranged thereon has an outline tapering in the longitudinal direction and more particularly a semi-conical outline and the sensor receiving space has an internal outline matching such outline so that the holding means with the electrode arranged on it may be lodged in the sensor receiving space like a wedge and may be fixed therein. The electrode is accordingly held in a stable position so that a high and more particularly readily reproducible degree of measuring accuracy is possible.

Preferably, the sensor possesses evaluating means to evaluate the reading detected at the two electrodes and then by a comparison of the readings with at least one reference value ascertain the at least one operational parameter. In the case of the reference valve it may be a question for example of a single value, as for example a voltage or capacity value. However, preferably the characteristics are stored in the evaluating means or may be recalled by same from an external memory so that for example a continuous change of an additive level is able to be found by comparison with the characteristic by way of the evaluating means.

It is clear that the evaluating means may constitute a component of the sensor or can be in the form of a separate structural unit able to be coupled with the sensor.

The manufacture of the servicing device and the performance of any necessary repairs is simplified if the evaluating means and the at least one first electrode constitute a structural unit, which is more particularly able to be renewed. The electrode and the evaluating means may consequently be mounted in one piece as it were on the servicing device and, for example following damage, may be removed again. It is in this manner that simple renewal of one sensor of the one type using a sensor of another type becomes possible.

In accordance with a particularly preferred form of the invention the evaluating means are arranged in a cover or floor portion of a basic housing of the servicing device, with the electrode projecting from the housing. The basic housing however may for example serve as a handle for the introduction of the electrode into the servicing device. A further advantage is in this case that any interfering electromagnetic fields originating from the evaluating means do not have any effect on the electrode or have hardly any such effect.

As already mentioned the dielectric is preferably an expendable material, as for example a filter means and/or an additive and/or a liquid, more particularly water or oil, and/or a parameter-dependent, moving element which therefore changes the dielectric value in the servicing space. In the latter case it can be a question of a more or less contaminated pressure medium that, dependent on the contaminant, may have different dielectric coefficients. The capacitive sensor of the invention may also detect any contamination occurring in the servicing space, as for instance soiling of the filter means, if the contamination has a suitable dielectric coefficient.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 3b is a cross sectional view of the sensor in FIG. 2, generally similar to the view of FIG. 3a.

DETAILED ACCOUNT OF WORKING EMBODIMENTS OF THE INVENTION

Figure 1:
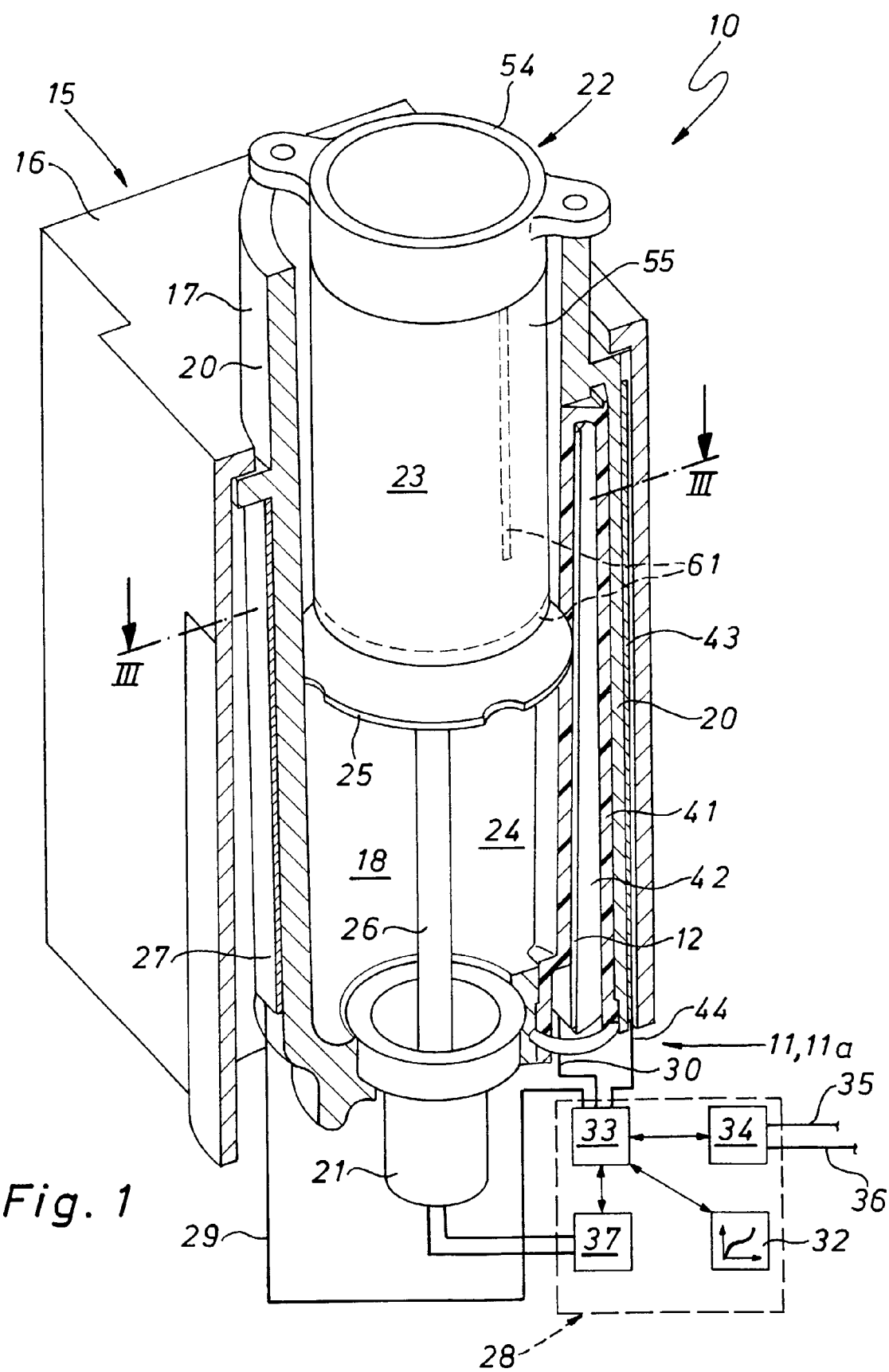
FIG. 1 shows a servicing device with a sensor, in the case of which a sensing electrode is arranged in a separate protective housing.

In the figures different embodiments both of a servicing device 10 and also of a sensor 11 are depicted. In the case of the forms of embodiment in accordance with FIGS. 1 and 3a the respective components are in the following provided with an index "a", and for instance the sensor is referenced 11a. On these lines in the case of embodiments of FIGS. 2 and 3b the index "b" is employed and in the case of the embodiment of FIG. 3c the index "c" is employed, that is to say, for instance the sensor 11 is denoted as sensor 11b and, respectively, 11c. To the extent that a single part of the specification refers to all embodiments, the respective reference numeral is employed without any lower case letters, and for example the sensors 11a through 11c are collectively referred to a "sensor 11".

The servicing device 10 is for example a filter device for the filtration of a pressure medium, in the present case compressed air. The servicing device 10 is for example designed as a servicing module, with which further such servicing devices may be linked in series modularly so that all in all a compact servicing unit results. In the case of the further servicing devices it may be a question for example of known dryers, oilers or other pressure medium conditioning devices or of novel devices in accordance with the invention. A multifunctional servicing device would be conceivable equipped with at least one capacitive sensor, which for example would filter the pressure medium and/or dry it and/or mix it, as for instance with oil or some other lubricant.

Of the housing 15 of the servicing device 10 FIG. 1 merely shows an outer basic outer housing 16 and a basic inner housing 17 arranged in same. The inner housing 17 at the top projects past the outer housing 16 and extends into a head piece, not illustrated, of the housing 15. On this head piece a pressure medium inlet and furthermore a pressure medium outlet are arranged, which communicate fluidwise with a servicing space 18 in the interior of the inner housing 17. The head piece may close the servicing device at the top. Otherwise a separate cover is provided for this purpose.

In the head piece and/or in the cover control means for instance are arranged, for example control electronic circuitry may be arranged for the control and/or monitoring of the servicing device 10. At the bottom the outer housing 16 is closed by a foot part 19, not illustrated.

A housing wall 20, which in the present case is essentially circularly tubular, of the inner housing 17 surrounds the servicing space 18. At the bottom end of the servicing space 18 a outlet means 21 is arranged, which closes the servicing space 18 at the bottom.

The housing wall 20 consists for example of plastic, glass or some other electrically non-conducting material. It is however also possible for the housing wall 20 to consist at least partially of electrically conducting material, special measures then being necessary for electrically insulating at least one electrode to be explained later.

The servicing space 18 extends, in the case of the servicing device 10 as well, essentially in the vertical direction. In the top section 23 of the servicing space 18 a filter means 22 is arranged, with which the servicing device 10 can filter the pressure medium. In the bottom section 24 of the servicing space 18 deposits from the pressure medium may collect, same being condensed water in the working example. A separating disk 25 separates the top the and the bottom section 23 and 24 from one another. The separating disk 25 is arranged on an actuating means 26 for the outlet means 21, which extends in the longitudinal direction of the servicing space 18 and is held by the outlet means 21. Using the outlet means 21 condensed water may be outlet from the servicing space 18 collecting in the bottom section 24 thereof. In the servicing space 18 other further components, not illustrated, may be arranged, as for example adjacent to the separating disk 25 a so-called steadying disk or at the top on the filter means 22 a so-called spin disk.

The servicing device 10 possesses a capacitive sensor 11 with a first electrode, termed a sensing electrode 12, for the detection of one or more operational parameters. Furthermore, the sensor 11 has a second sensor 27 associated with it, which in the following will be termed the counter-electrode for the sake of simplicity. The sensing electrode 12 may be a so-called active electrode, from which field lines extend toward the counter-electrode 27.

The counter-electrode 27 may be an integral component of the sensor 11. In the working embodiment illustrated the counter-electrode 27 is however designed as a separate component, which, just like the sensing electrode 12 is connected with evaluating means 28 by way of connections 29 and respectively 30. The connections 28 and 29 may be in the form of permanently connected (f. i. soldered) electrical lines for example and/or may comprise connecting elements for releasable connections, for instance plugs. The evaluating means 28 and the sensing electrode 12 constitute in the present case a structural unit 31, which may be mounted on the servicing device 10, and if necessary may be renewed. It will be clear that the sensing electrode 12 may also be connected permanently with the servicing device 10, for example as a component of the housing wall 20.

The sensing electrode 12 and the counter-electrode 27 and furthermore the dielectrics respectively arranged between them, as for example the housing wall 20, the filter means 22 and the condensed water in the bottom section 24, constitute a capacitor, whose capacitance is evaluated by the evaluating means 28. Dependent on the respective dielectrics i.e. on the composition of the dielectric located between the electrodes 12 and 27 the so-called dielectric constant $\in$ will vary. The dielectric constant $\in$ is the product of the dielectric coefficient $\in_r$ and the electrical field constant $\in@$. In the case of water the dielectric coefficient $\in_r$ is 80, and in the case of oil it is 2 to 3. If in the bottom section 24 there is water or an additive, for instance oil, the dielectric constant ∈ will change accordingly so that the evaluating means 28 can detect this change at the electrodes 12 and 27.

In the simplest case only one limiting value is monitored, that is to say for example, if in the section 24 a predetermined quantity of condensed water has collected and the dielectric constant has consequently reached an upper limiting value, this will be detected by the evaluating means 28 and for example a master control will respond and/or the outlet means 21 will be opened so that the condensed water may flow off. When this happens the outlet means 21 is opened for a predetermined time or it remains open dependent on the condensed water level until a lower limiting value of the dielectric coefficient ∈ is reached, which corresponds to a lower condensed water level in the bottom section 24.

The evaluating means 28 can not only find a operational parameter by comparison with one or more separate reference points, but also find or ascertain the operational parameter or parameters by a comparison between the readings from the electrodes 12 and 27 and characteristics, which are held in a memory 32 of the evaluating means 28. In the case of the memory 32 it can for example be a question of a random access memory (RAM) component, or an erasable programmable read only memory component ((E)PROM). The memory 32 is interrogated by a module 33 of the evaluating means 28.

The evaluating means 33 takes readings from the electrode 12 and 27, for example by cyclical scanning, and compares the readings with at least one characteristic stored in the memory 32 in order to find at least one operational parameter. The parameter is supplied by the evaluating means 33 to a bus interface module 34 which then passes the respective operational parameter to a servicing bus 35 and/or a central control bus 36. By way of the servicing bus 35 designed as a local bus the servicing device 10 is able to be coupled with further servicing devices, as for example a dryer and/or an oiler, forming a servicing assembly. By way of the central control bus 36—a higher level bus—the evaluating means 28 and hence the servicing device 10 may be connected with a central control means. The central control means, not illustrated, may be provided for the control and/or monitoring of the servicing device 10 and further components, not illustrated, for example valves supplied with the pressure medium.

It is however also possible for the evaluating means 28 to comprise a local operating means or for example to be able to be plugged to a local operating means, which may receive readings, limiting values, warnings or the like, from the evaluating means 28. The operating means can comprise output means such as a liquid crystal display (LCD) and/or light emitting diodes (LEDs) and/or input means, such as control keys or the like, by which commands may be entered in the evaluating means 28. For instance, the input means may be employed to interrogate a table of warnings or to parametrically process a limiting value. It is also possible for only one local operating means and without any bus interface module (f. i. no bus interface module 34) to be provided.

In the present example the evaluating means 28 furthermore comprise a control module 37, which controls an outlet valve, not illustrated, of the outlet means 21 in a manner dependent on at least one operational parameter supplied by the evaluating means 33, that is to say opens or closes it. In the case of the operational parameter it is in the working example a question of the level or an upper and/or lower level limiting value for a liquid, which is located in the bottom section 24 of the servicing space 18. It will be clear that the control module 37, the bus interface module 34 and furthermore the memory 32 are optional and are at least partly preferred components of the evaluating means 28.

The evaluating means 28 may be made up of discrete electrical components and/or comprise a processor arrangement. More particularly in the latter case significant functions of the evaluating module 33 and/or the control module 37 are implemented by the program code able to be executed by the processor arrangement.

In the memory 32 the at least one characteristic may be permanently stored and/or be entered by the evaluating module 33. The respective characteristic may for example be transmitted by way of the control bus 36 to the evaluating module 33. It would be feasible however as well for the evaluating module 33 to enter at least one characteristic in a sort of automatic learning process. For this purpose the evaluating module 33 is switched into a programming mode and for example water or oil is poured into the servicing space 18, starting at the bottom level, as far as a top limiting level. At the same time the evaluating means 28 will, for example, find the capacitances between the electrodes 12 and 27 and will enter same as reference characteristics in the memory 32.

In the case of the present example operational parameters of the "condensed water" type (or oil in the case of an oiler) are detected by the sensor 11. The sensor 11 may however detect several different operational parameters as well owing to its three-dimensional design, that is to say in the working example "filter means 22 present or not present" and "type of the filter means 22". For this purpose the electrodes 12 and 27 extend in the present case in parallelism to the longitudinal axis of the servicing space 18, that is to say in the present case in a vertical direction. In the case of a different configuration of the servicing space 18 it is possible for the electrodes 12 and 27 to extend in a different direction adjacent to it. In any case in the present example both sections 23 and 24 are at least partly in the detection range of the electrodes 12 and 27 so that electrical field lines between same extend through the servicing space 18 both in the section 23 and also in the section 24. The field lines are influenced, dependent on the dielectric, as for example the filter means 22 and/or a liquid, present in the respective sections 23 and 24, this ultimately having its effect on the capacitance readings detected at the electrodes 12 and 27.

The electrodes 12 and 27 are for example in the form of continuous, electrically conducting faces. The counter-electrode 27 is for example of copper foil arranged on the outer periphery of the housing's wall 20. Instead of a copper foil, which may for example be self-adhesive, it would be possible to vapor deposit a metallic layer on the housing wall 20. In any case it is preferred not to have any inclusions between the housing wall 20 and the counter-electrode 27. However, it is also possible for the counter-electrode 27 to be arranged in the interior of the housing wall 20 or on the inner side of the housing wall 20 facing the servicing space 18. In the latter case insulation, for example in the form of a plastic foil or the like, is preferably arranged on the counter-electrode 27 so that same is electrically insulated from the servicing space 18.

The counter-electrode 27 surrounds the servicing space 18 in the peripheral direction except for a segment section 38. At the segment section 38 the sensing electrode 12 is arranged. In the segment section 38 of the housing wall 20 there is a sensor receiving space 39 to accommodate the sensing electrode 12. The sensor receiving space 39 extends in the longitudinal direction of the servicing space 18. The sensor receiving space 39 is in the case of the design of the servicing device 10 in accordance with FIGS. 1 and 3a open toward the servicing space 18 and in the working example in accordance with FIGS. 3b and 3c is separated off by a partition 40. The partition is preferably thin and in any case thinner than the housing wall 20. In the working embodiment in accordance with FIGS. 3b and 3c one could say that the sensor receiving space 39 is formed in the housing wall 20. The partition 40 electrically insulates the sensing electrode 12 from the servicing space 18. If there is no partition 40 (FIGS. 1 and 3a) the sensor 11 will in the embodiment of FIG. 3a possess a guard housing 41 which insulates it electrically and/or mechanically from the servicing space 18.

In the case of the sensors 11a and 11b the sensing electrode 12 is arranged on holding means 42 holding and securing the sensors. The electrode 12 may for example be constituted for example by vapor deposited metal on the holding means 42 or by a metal foil applied to same. The thickness of the electrode 12 indicated is only to be understood as an example. It can naturally be extremely thin or, as for example in the case of the sensor 11c, in the case of which there are no holding means 42, it may be comparatively thick so that it may be introduced into the sensor receiving space 39 without any supporting holding means. It is also possible for the sensing electrode 12 to constitute a component of the housing wall 20, as for example an electrically conductive section, which is integrated in the housing wall 20 in the course of manufacture.

The holding means 42—and in the case of the sensor 11a the guard housing 41 as well—comprise a shape tapering in the longitudinal direction, which in the present case is semi-conical. The sensor receiving space 39 has a matching inner form so that however the holding means 42 for the sensor 11b may be introduced with the electrode 12 arranged thereon, and, respectively, in the case of the sensor 11a, like a wedge into the respective sensor receiving space 39 and may be secured therein. In any case this means that the sensing electrode 12 is secured in place in the servicing space 18 so that the readings from the electrodes 12 and 27 are reproducible.

Figure 3A:
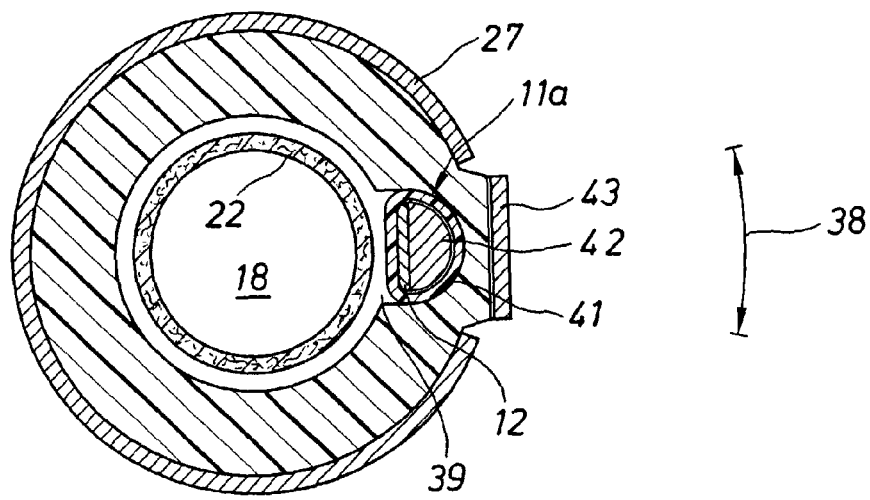
FIG. 3a shows the servicing device in a diagrammatic cross sectional view generally on the section line III—III of FIG. 1.
Figure 3B:
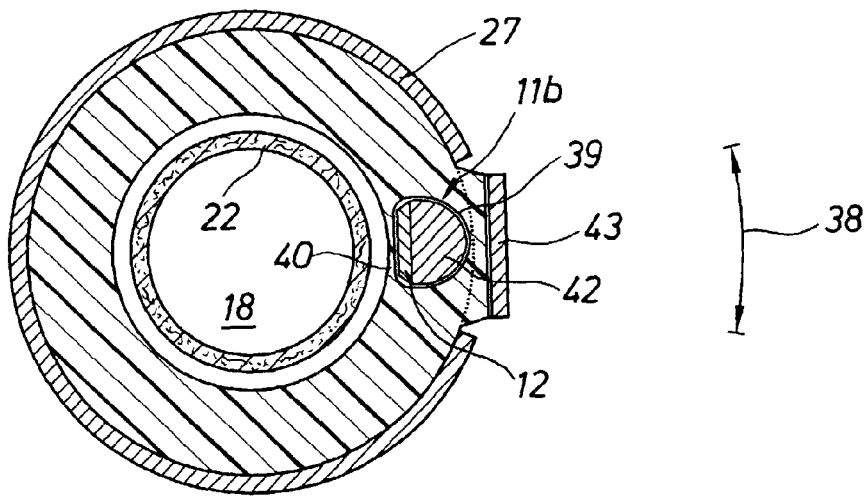
Figure 3C:
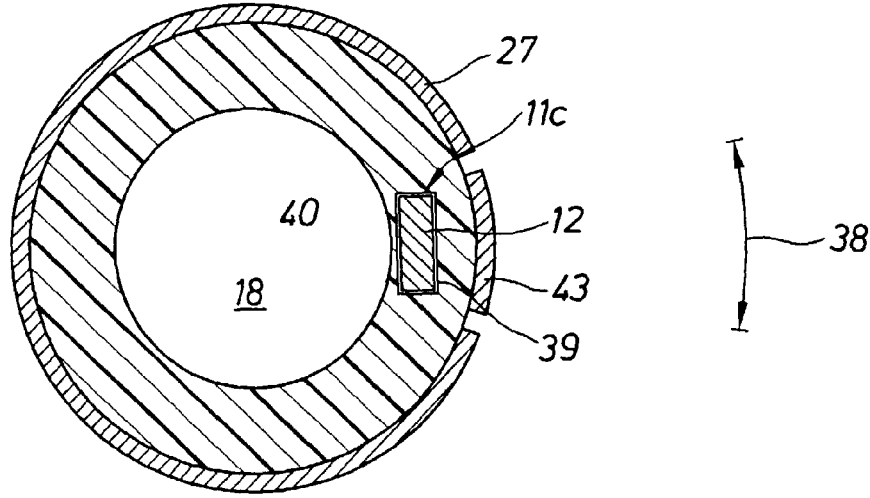
FIG. 3c shows a sensor also in the above mentioned cross sectional view, whose sensing electrode, departing from the embodiments of FIGS. 3a and 3b, is not arranged on a holding means.

In the working embodiments illustrated in FIGS. 3a and 3b the housing wall 20 is made thicker in the portion facing away from the servicing space 18 behind the respective electrode 12 in order to have a sufficient thickness of the housing wall 20. More particularly in FIG. 3b the outline marked in chained lines of the housing wall 20 is without any thickening. If however the housing wall 20 already has a sufficient thickness as such and/or the sensing electrode 12 is comparison slim, as is indicated in FIG. 3c, such a thicker design is not absolutely necessary.

The sensing electrode 12 is provided with a screen 43, which is arranged on the side of the sensing electrode facing away from the servicing space 18. The screen 43 is for example constituted by a vapor deposited or bonded on metallic face and in the present case is connected with the evaluating means 28 by way of a permanent or releasable connection 44. In the working embodiment the screen 43 extends in the longitudinal direction of the sensing electrode 12. In the working embodiment illustrated examples (FIGS. 3a through 3c) the screen 43 is arranged externally on the housing wall 20. It is however also possible for a screen to be arranged on the sensing electrode 12, it being in this case separated electrically from it. For instance, a metallic layer functioning as a screen could be applied to the holding means 42 and on such layer an insulating layer would be applied, for example of plastic, and in turn a metallic layer serving as a sensing electrode could be deposited on the insulating layer. It would however also be possible for the electrode 12 to be arranged on one side of a printed circuit board and for a screen to be arranged on the side opposite to this side.

In all the above mentioned working embodiments the sensing electrode 12 is preferably arranged as close as possible to the servicing space 18 in order to minimize the influence of the housing wall 20 as a dielectric. The same will apply for the counter-electrode 27. However, the illustrated working examples, in the case of which the counter-electrode 27 is arranged externally on the housing wall 20, are more advantageous from the point of view of manufacturing technology. Preferably there should, if possible, be no inclusions of air on the sensing electrode 12 and/or the counter-electrode 27. For this purpose, for example in the case of the sensor 11a the guard housing 41 (consisting for example of plastic) could be cast around the sensing electrode 12 and the holding means 42.

The arrangement and the design of the electrodes 12 and 27 in the servicing device 10 do as such constitute an invention in their own right. The same applies for the assembly of the sensing electrode 12 and the evaluating means 28 on the structural unit 31, which constitutes a renewable or at least readily mounted sensor module 45.

The sensor module 45 contains a basic housing 46 with a floor part 47 and a cover part 48. On the basic housing 47 cable and/or plug contact elements or other contact faces (not illustrated) are arranged for making contact with, for example, the counter-electrode 27 and the control bus 36 and/or an operating means (not illustrated) as explained above. The basic housing 46 the components of the evaluating means 28 are arranged on a printed circuit board 49. On the basic housing 46 has a through opening 50, which in the present case extends vertically in the middle and which in the assembled state has the outlet means 21 extending through it. In the present case the basic housing 46 possesses a cylindrical shape. Accordingly the printed circuit board 49 arranged in the interior is in the form of a circular disk and has an aperture 51 corresponding to the opening 50. The basic housing 46 is arranged, in the mounted state, in the floor part of the servicing device 10. The holding means, serving to hold the sensing electrode 12, may be seen to extend upward from the basic housing 46. The holding means 42 can be held by a shank 52 arranged on the top on the basic housing 46. On the shank 52 a seal 53 is arranged for sealing off the servicing space 18 and/or the sensor receiving space 39. The sensing electrode 12 extend through the shank 52 and is connected with the printed circuit board 49 electrically.

Figure 2:
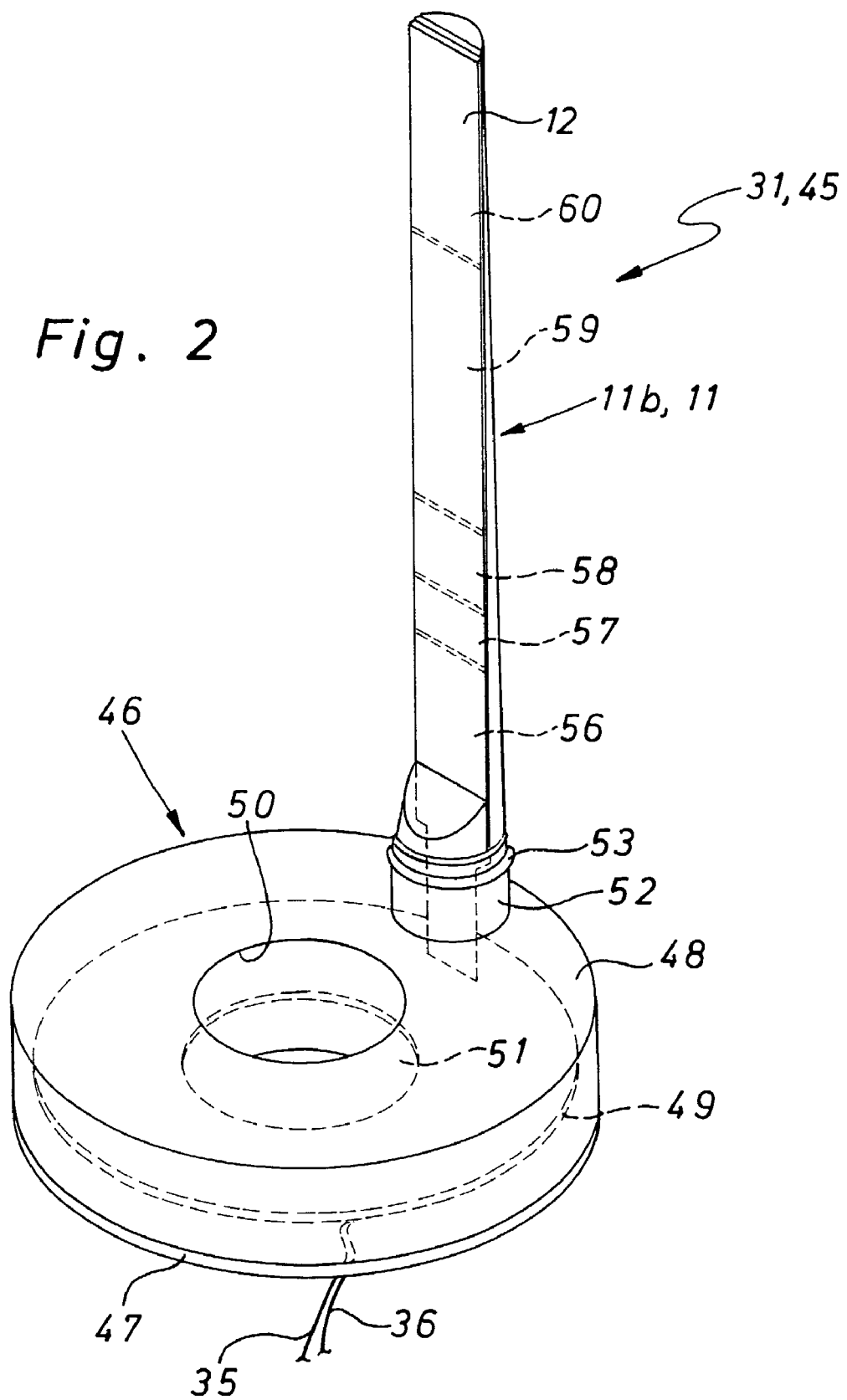
FIG. 2 illustrates a sensor, in the case of which unlike the sensor the sensing electrode there is no separate protective housing for it.

The sensor 11a for the servicing device 10a in accordance with FIG. 1 basically has the same structure as the sensor 11b t in accordance with FIG. 2, although however there is in addition a guard housing 41 surrounding the sensing electrode 12 and the holding means 42. The guard housing 41 is seated on the shank 52 in a sealing manner. It is also possible for a shank to be formed on the guard housing at the bottom.

In the examples so far the detection of different values of an operational parameter has been respectively explained with one electrode 12 and 27. Even with this arrangement it is possible to detect or read a plurality of different operational parameters. This is now to be explained with reference to FIG. 4, in the case of which the dielectric characteristics K1 and K2 are plotted, which may be detected for variable volumes V of condensed water in the bottom section 24 at the electrodes 12 and 27.

Both the bottom section 24 and also the top section 23 of the servicing space 18 are within the detection range of the electrodes 12 and 27. If a filter means 22 of a type "1" is placed in the top section 23 and if in the bottom section 24 so far no condensed water has collected (volume of condensed water less than $V_{min}$) the dielectric constant $\in$ in the servicing space 18 will assume an initial value of $\in_1$. If then condensed water collects in the section 24 the dielectric constant $\in$ will increase along a characteristic K1 until the volume of the condensed water reaches a value of $V_{max}$, at which the dielectric constant of $\in$ is equal to $\in_2$. At the electrodes 12 and 27 the evaluating means 28 will detect the capacitance values, which are dependent on the dielectric constant $\in$ varying in accordance with the characteristic K2.

Figure 4:
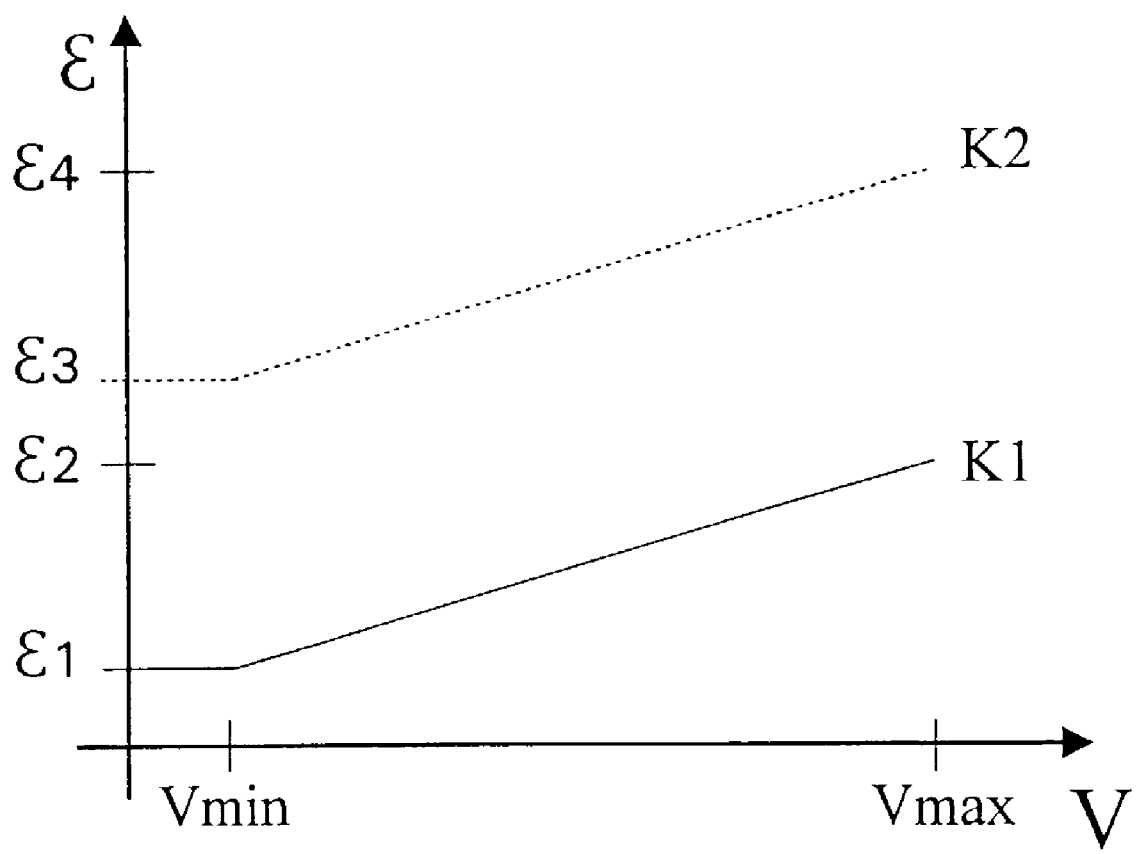
FIG. 4 is a reference characteristic K1 and K2, which is employed by the sensors for the detection of operational parameters.

If a filter means 22 of type "2" is placed in the servicing space 18, the initial value of the dielectric constant $\in$ (when V is equal to $V_{min}$) will be $\in_3$. If the condensed water rises in the section 24, then the dielectric constant $\in$ will rise in accordance with characteristic K2 to a value $\in_4$, when the volume of the condensed water (V) reaches $V_{max}$. In this respect it is to be noted that FIG. 4 represents an extremely simplified variation pattern of the dielectric constant $\in$. Other patterns, more particularly non-linear patterns, are readily possible.

It will be clear that the reference characteristics of dielectric constants, as illustrated in FIG. 4, and/or of capacitances may be held in the memory 32. In any case the characteristics are preferably digitalized, i.e. digital values of so-called support points of the respective characteristics are held in the memory 32.

In a preferred design in accordance with the invention there is however not merely one single sensing electrode 12, but a plurality of first sensing electrodes. Same can be freely locatable electrodes or, as depicted in FIG. 2, in the form of a coherent electrode arrangement. In the case of the example of FIG. 2 a plurality of first sensing electrodes 56 through 60 are arranged in the longitudinal direction of the holding means 42 and accordingly are arranged adjacent to one another. In this case each sensing electrode 56 through 60 is provided for a separate section of the servicing space 18 so that a dielectric respectively located here may be detected by the respective sensing electrode 56 through 60. For instance, the sensing electrodes 59 and/or 60 may detect the filter means 22 whereas the sensing electrodes 56, 57 and 58 may detect condensed water collecting in the section 24.

Each sensing electrode 56 through 60 is in the present case connected with the evaluating means 28. For instance, the sensing electrodes 56 through 60 are scanned by the evaluating means in a in a predetermined cycle. In a fashion dependent on the respective reading the evaluating means will then ascertain the respective operational parameter dependent thereon.

It is however also possible for each of the sensing electrodes 56 through 60 to be provided with separate evaluating means or separate module parts of the evaluating means. Moreover, a first group of sensing electrodes, for instance the sensing electrodes 56 through 58, may be provided with first evaluating means whereas a second group of sensing electrodes, for example the sensing electrodes 59 and 60, may be provided with second evaluating means.

The filter means 22 is designed in the form of a filter cartridge in the servicing device 10 able to be renewed. It comprises for example a circularly cylindrical holding ring 54, which holds a filter of non-woven material 55. On the filter means 22 capacitively detectable codes 61 are provided, in the case of which it is for example a question of metallic elements arranged on the non-woven filter material 55. It is possible as well for the non-woven filter material 55 to contain metallic elements, mica or the like. Furthermore it would be possible as the dielectric to employ different types of materials acting as dielectrics for different types of filter means, for example corresponding materials for the non-woven filter material 55. Furthermore the holding ring 54 could serve as a capacitively detectable code, same then for example being made up of materials having different dielectric coefficients and/or being made with different dimensions so that its three-dimensional configuration would represent a code. Mutatis mutandis this will also apply for other expendable materials, as for example an additive, which is arranged in the bottom section 24 and is to be added to the pressure medium. Moreover, additives may be utilized to provide for capacitive encoding, as for instance by the addition of small amount of metallic particles, graphite or the like.

Any desired combinations of the measures indicated in the specification and also in the claims are readily possible. Furthermore further modifications of the invention are possible.

For instance for capacitive encoding suitably selected ceramic compositions with barium or titanium may be employed, which have comparatively high dielectric numbers.

As an alternative housing wall 20 may also as an example be manufactured of glass, ceramic or porcelain. Furthermore hybrid forms or mixtures are possible. It will be clear that the sensor in accordance with the invention may be employed to detect other operational parameters than those described in the working examples. For instance the sensor in accordance with the invention could be utilized to ascertain pressure and/or flow rate of the pressure medium. The sensing electrode 60 could for example be arranged in a movable fashion so that it would be deflected in a manner dependent on pressure and/or rate of flow and different capacitance values could be read from it.

It will be clear that instead of a single counter-electrode 27 a plurality of counter-electrodes would be possible. This applies both in combination with a single sensing electrode, as for example the sensing electrode 12, and also in combination with a plurality of first sensing electrodes, as for example the sensing electrodes 56 through 60.

Instead of the depicted designs of the servicing device 10, in the case of which the segment section 38 is comparatively narrow and the sensing electrode 12 is accordingly compact in form, other geometrical structures are possible, in the case of which the servicing space has field line extending through it between the sensing electrode and the counter-electrode. For instance, it is possible for the sensing electrode also to occupy a larger fraction of the outer periphery of the servicing space, it being preferred for the sensing electrode to occupy at the maximum approximately half the outer periphery of the servicing space and for the counter-electrode to occupy the corresponding remaining other fraction of the outer periphery of the servicing space.

The invention claimed is:

1. A servicing device for the treatment of a pressure medium, comprising:
   a means for filtering and/or oiling the pressure medium including a housing for containing an expendable material the housing having a wall defining a servicing space, the servicing space including a longitudinal axis, the wall having an inner surface in contact with the servicing space; and a first electrode and a second electrode which cooperate together to form a capacitive sensor being responsive to at least one operational parameter of the servicing device, the first electrode being disposed adjacent the housing wall and spaced a first distance from the servicing space longitudinal axis, and the second electrode supported on the housing wall and spaced a second distance from the servicing space longitudinal axis, wherein the second distance is greater than the first distance such that the first and second electrodes are separated by at least a portion of the thickness of the housing wall.

2. The servicing device as set forth in claim 1, wherein the servicing space receives the expendable material and is able to be employed for filtering and/or oiling the pressure medium and/or for receiving deposits from the pressure medium, the sensor being associated with the servicing space so as to be responsive to a dielectric able to be arranged therein, said at least one operational parameter being dependent on such dielectric.

3. The servicing device as set forth in claim 2, wherein the first and second electrodes are so arranged that electrical field lines between the at least one first electrode and the at least one second extend through the servicing space.

4. The servicing device as set forth in claim 2, wherein said sensor extends along at least one first and at least one second section of the servicing space and wherein said sensor is responsive to at least one first operational parameter of the servicing device and in the second section is responsive to at least one second operational parameter of the servicing device.

5. The servicing device as set forth in claim 2, wherein the servicing space is surrounded by a housing wall and wherein housing wall has a sensor receiving space for the at least one first electrode of the sensor.

6. The servicing device as set forth in claim 5, wherein the sensor receiving space is separated from the servicing space by a partition.

7. The servicing device as set forth in claim 6, wherein the partition is thinner than the housing's wall.

8. The servicing device as set forth in claim 2, wherein the at least one first electrode has a screen associated with it, such screen being arranged adjacent to a side, facing away from the servicing space, of the at least one first electrode.

9. The servicing device as set forth in claim 2, wherein the at least one first electrode possesses an elongated configuration and is able to be arranged in parallelism to the longitudinal axis of the servicing space, more especially in a vertical direction.

10. The servicing device as set forth in claim 2, wherein the dielectric is an expendable material, more particularly a filter means or an additive and/or a liquid, more especially water and/or oil and/or a parameter-dependent element, which moves and thereby changes the dielectric coefficient in the servicing space.

11. The servicing device as set forth in claim 1, wherein the at least one first electrode is plate-like and is more particularly in the form of a printed circuit board.

12. The servicing device as set forth in claim 1, wherein the at least one first electrode is arranged on holding means holding and securing it in position.

13. The servicing device as set forth in claim 12, wherein the holding means for holding the at least one first electrode is formed in a sensor receiving space and wherein the holding means together with the at least one first electrode arranged thereon has a shape tapering in the longitudinal direction and more especially of semi-conical cross section and the sensor receiving space has an inner shape corresponding to such outer shape so that the holding means with the at least one first electrode arranged thereon may be introduced into and secured in the sensor receiving space with a wedging effect.

14. The servicing device as set forth in claim 1, further including an evaluating means for evaluating a reading detected at the first and second electrodes and comparing the readings with at least one reference value for ascertaining the at least one operational parameter.

15. The servicing device as set forth in claim 14, wherein such evaluating means and the at least one first electrode constitute a more particularly interchangeable structural unit.

16. The servicing device as set forth in claim 14, wherein the evaluating means are arranged in a basic housing able to be arranged in a cover or feedback portion of the servicing device from which housing one first electrode projects.

17. The servicing device as set forth in claim 1, wherein the first electrode is positioned within an opening formed in the housing wall.

18. The servicing device as set forth in claim 1, wherein the second electrode is positioned on an outer surface of the housing wall.

19. An expendable material for a servicing device for filtering a pressure medium, comprising:
a filter removably insertable into a housing including a capacitive sensor, the filter including a filter element for removing material from a pressure medium, and a capacitively detectable code device supported on the filter and removable from the housing upon removal of the filter from the housing, the code device including a ring disposed adjacent the filter element, the code device creating a predetermined dielectric value permitting at least one operational parameter of the expendable material to be detected by a capacitive sensor of the servicing device.

20. The expendable material as defined in claim 19, wherein the filter element includes a filter material and the capacitively detectable code device includes metallic elements arranged on the filter material.

21. The expendable material as defined in claim 19, wherein the filter element includes a filter material containing elements forming the capacitively detectable code device.

22. A servicing device for the treatment of a pressure medium comprising:
a housing defining therein a servicing space for receiving an expendable material, the servicing space having a longitudinal extent, the expendable material including a filter, and the servicing space including a section for storing material removed by the filter; and
a capacitive sensor longitudinally extending along at least one first and at least one second section of the servicing space and wherein said sensor first section is responsive to at least one first operational parameter of the servicing device and in the second section is responsive to at least one second operational parameter of the servicing device, wherein the first operational parameter corresponds to a property of the filter and the second operational parameter corresponds to a property of the material stored in the servicing space.

23. The expendable material as defined in claim 22, wherein the sensor includes a plurality of first electrodes and at least one second electrode, and wherein one of the plurality of first electrodes extends along the first servicing space section and another of the first electrodes extends along the second serving space section.

24. A servicing device for the treatment of a pressure medium, comprising:
- a means for filtering and/or oiling the pressure medium including a housing for containing an expendable material; and
- a capacitive sensor having at least one first electrode being responsive to at least one operational parameter of the servicing device, the at least one first electrode is arranged on a holder securing it in position, the holder is formed in a sensor receiving space, the holder together with the at least one first electrode arranged thereon having a shape tapering in the longitudinal direction and more especially of semi-conical cross section and the sensor receiving space having an inner shape corresponding to such outer shape so that the holder with the at least one first electrode arranged thereon may be introduced into and secured in the sensor receiving space with a wedging effect.

25. An expendable material for a servicing device for filtering a pressure medium, comprising:
- a filter removably insertable into a housing including a capacitive sensor, the filter including a filter element for removing material from a pressure medium, and a capacitively detectable code device supported on the filter and removable from the housing upon removal of the filter from the housing, the filter element includes a filter material and the capacitively detectable code device includes metallic elements arranged on the filter material, the code device creating a predetermined dielectric value permitting at least one operational parameter of the expendable material to be detected by a capacitive sensor of the servicing device.

* * * * *